(12) United States Patent
Vihriälä

(10) Patent No.: US 7,266,143 B2
(45) Date of Patent: Sep. 4, 2007

(54) METHOD FOR MULTIPLE ACCESS INTERFERENCE SUPPRESSION, AND RECEIVER

(75) Inventor: Jaakko Vihriälä, Oulu (FI)

(73) Assignee: Nokia Corporation, Espoo (FI)

( * ) Notice: Subject to any disclaimer, the term of this patent is extended or adjusted under 35 U.S.C. 154(b) by 937 days.

(21) Appl. No.: 10/411,352

(22) Filed: Apr. 11, 2003

(65) Prior Publication Data

US 2003/0215004 A1 Nov. 20, 2003

(30) Foreign Application Priority Data

Apr. 12, 2002 (FI) ................................. 20020715

(51) Int. Cl.
*H04B 1/00* (2006.01)

(52) U.S. Cl. ...................... 375/148; 375/144

(58) Field of Classification Search ............... 375/143, 375/144, 147, 148, 152, 346, 350
See application file for complete search history.

(56) References Cited

U.S. PATENT DOCUMENTS 5,787,130 A 7/1998 Kotzin et al.
6,473,415 B1 * 10/2002 Kim et al. .................. 370/342

FOREIGN PATENT DOCUMENTS

WO  WO 01/45287 A1  6/2001
WO  WO 01/89106 A1  11/2001
WO  WO 02/03561 A1  1/2002

OTHER PUBLICATIONS

Kim et al, "Multi-Mode Subtractive Interference Cancellation For Asynchronous Multi-Path Channels" Vehicular Technology Conference, 1999 IEEE 49th Houston TX, USA May 16-20, 1999, Piscataway, NJ, USA, IEEE, US, May 16, 1999, pp. 1430-1434.

* cited by examiner

*Primary Examiner*—David B. Lugo
(74) *Attorney, Agent, or Firm*—Squire, Sanders & Dempsey L.L.P.

(57) ABSTRACT

The invention relates to a method for multiple access interference suppression and to a receiver applying the method. A preliminarily detected signal is spreading coded and channel distorted in a MAI estimator (350) for generating an estimate signal (274) corresponding to a received and reception-filtered signal. Pulses (360) corresponding to a signal component of each path of each user are generated from the signal in a pulse generator block (300), and the pulses are combined according to path delays into a pulse sequence (362) in a combiner (310). In a filter (312), the pulse sequence (362) is subjected to waveform filtering, which is the convolution of reception filtering and pulse shaping filtering. Finally, in a summer (220), the estimate signal (274) is subtracted from the received and reception-filtered signal (270) to cancel multiple access interference.

22 Claims, 5 Drawing Sheets

METHOD FOR MULTIPLE ACCESS INTERFERENCE SUPPRESSION, AND RECEIVER

BACKGROUND OF THE INVENTION

1. Field of the Invention

The invention relates to multiple access interference suppression in a received signal.

2. Description of the Related Art

In CDMA (Code Division Multiple Access), a narrowband user data signal is modulated using a spreading code having a broader band than the data signal into a relatively broad band. In the WCDMA radio system (Wideband CDMA), the bandwidth is considerably wider, the purpose being the ability to provide a user with increasingly more versatile services in present mobile networks.

Since the spreading codes used by different users are not fully orthogonal, signals transmitted by the different users interfere with each other in the receiver, i.e. multiple access interference (MAI) is generated.

Multiple access interference can be cancelled by the use of an optimal receiver based on MAP (Maximum A Posteriori) or MLSD (Maximum Likelihood Sequence Detection) detection. The problem in these solutions is, however, that the complexity of the receiver increases exponentially with the number of users. Attempts have also been made to cancel multiple access interference by the use of different interference suppression methods in a suboptimal receiver, such methods including MMSE receivers (Minimum Mean Square Error) and interference cancellation (IC) solutions. Interference cancellation solutions include parallel interference cancellation (PIC) and series mode interference cancellation (SIC), a modification of which is groupwise SIC (GSIC). In PIC interference cancellation, the signals of all users are usually detected simultaneously from a received signal, the received signal is regenerated and the detection is repeated utilizing the detected signal and the regenerated signal. This way, interference is suppressed for all users simultaneously, i.e. in parallel. In series mode interference suppression, interference is suppressed successively user-specifically or user group-specifically. Interference suppression may be further enhanced by the use of multistage interference suppression structures. In this case, each interference suppression stage reuses the bit decisions of the previous interference suppression stage to improve performance.

However, suboptimal interference suppression has not eliminated the complexity of the receiver; instead, a plurality of filters are still needed in interference suppression, wherein a large number of multiplications requiring a high computing power are performed using different coefficients.

SUMMARY OF THE INVENTION

The object of the invention is thus to provide an improved method and a receiver implementing the method providing reduced complexity. This is achieved by a method for multiple access interference suppression, in which method a received signal is filtered by reception filtering, the delays of at least one user's signal components, propagated along different paths, are estimated, and at least one user's signal is detected preliminarily from the received signal. For generating an estimate signal corresponding to the received signal filtered using reception filtering, the preliminarily detected signal is spreading coded and channel distorted; pulses, corresponding to a signal component of each path of each user, are generated from the preliminarily detected, spreading coded and channel distorted signal; the pulses are combined according to the delays into a pulse sequence; waveform filtering, which is a combination of at least reception filtering and pulse shaping filtering, is performed on the pulse sequence; and the estimate signal is subtracted from the received signal, filtered using reception filtering, to cancel multiple access interference.

The invention also relates to a receiver configured to suppress multiple access interference in a radio system comprising subscriber terminals and at least one base station, the terminals and at least one base station being configured to serve as the receiver; the receiver comprises a reception filter for filtering a received signal; the receiver is configured to estimate delays of at least one user's signal components propagated along different paths and to preliminarily detect at least one user's signal from the received signal. The receiver is further configured to spreading code and channel distort the preliminarily detected signal; and the receiver comprises means for generating pulses from the preliminarily detected, spreading coded and channel distorted signal, the pulses corresponding to the signal component of each path of each user; means for combining the pulses according to path delays into a pulse sequence; means for generating an estimate signal by subjecting the pulse sequence to waveform filtering, which is a combination of at least reception filtering and pulse modifying filtering; and means for subtracting the estimate signal from the received signal filtered by reception filtering to cancel multiple access interference.

The preferred embodiments of the invention are disclosed in the dependent claims.

The invention is based on placing pulse shaping filtering after MAI estimation. In this case, upon generation of a MAI signal estimate, pulses are generated from the preliminarily detected, spreading coded and channel distorted signal that correspond to the signal component of each path of each user, the pulses being combined according to path delays into a pulse sequence. The pulse sequence is then filtered by pulse shaping filtering using a combination of reception filtering and pulse shaping filtering.

The method and system of the invention provide a plurality of advantages. The solution reduces the number of filtering operations in the filters and the number of coefficients used in the filtering in interference suppression, which in turn reduces heavy multiplication operations, thus simplifying both computing and the structure of the interference suppression implementation. The solution also reduces the number of filters and allows the filter to be made smaller.

BRIEF DESCRIPTION OF THE DRAWINGS

In the following, preferred embodiments of the invention will be described in detail with reference to the accompanying drawings, in which.

DETAILED DESCRIPTION OF THE PREFERRED EMBODIMENTS

The interference suppression solutions presented are applicable to telecommunication systems. One such telecommunication system is a WCDMA radio system employing wideband spread spectrum data transmission. In the following, the implementations will be described by using the GPRS and UMTS radio systems as examples, without, however, any restriction thereto, as is apparent to a person skilled in the art.

Figure 1:
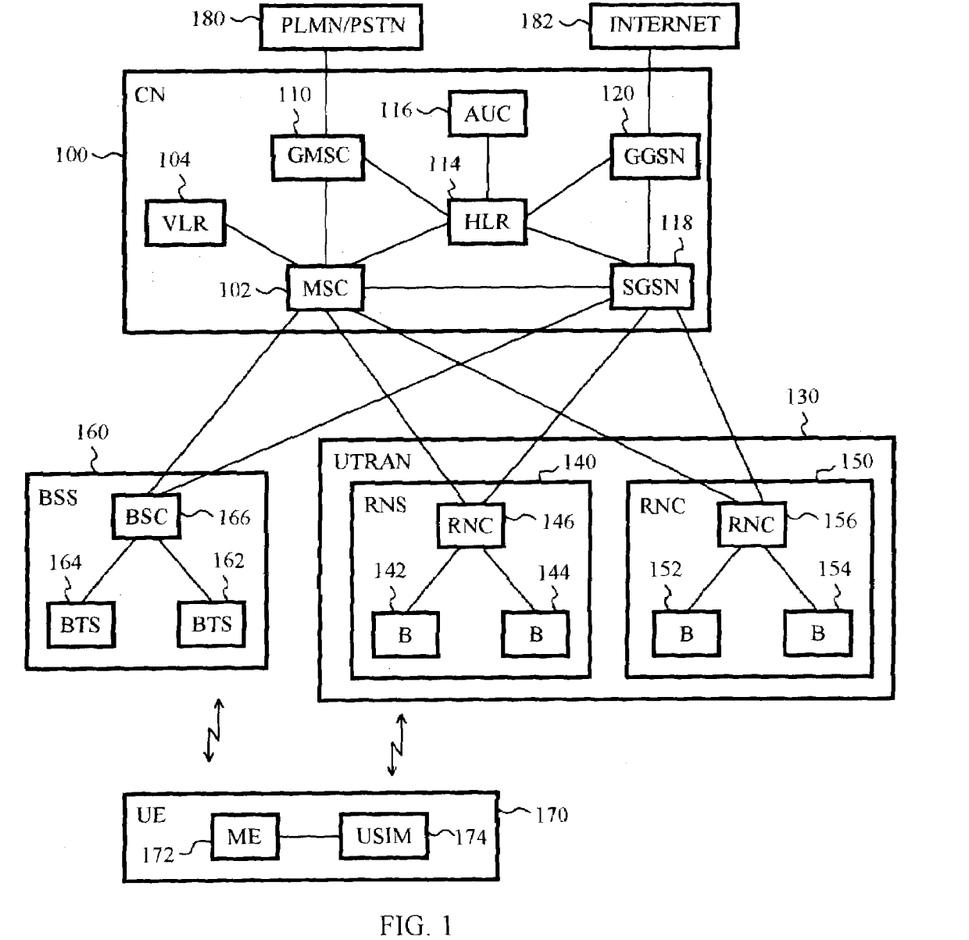
FIG. 1 is a simplified block diagram of the structure of radio systems.

Let us first study FIG. 1 illustrating the structure of radio systems in a simplified manner at network element level. The structure and functions of network elements are described on a quite general level, since they are generally known per se. A core network CN 100 describes the radio-independent layer of a telecommunication system. A first radio system, i.e. a radio access network UTRAN 130 and a second radio system, i.e. a base station system BSS 160 illustrate radio systems. The term UTRAN means UMTS (Universal Mobile Telephone System) Terrestrial Radio Access Network, i.e. the radio access network 130 is implemented by the wideband code division multiple access method. The figure also shows user equipment UE 170. The base station system 160 is implemented by the time division multiple access method (TDMA).

A general definition may also be presented, according to which a radio system is composed of a subscriber terminal, also called user equipment and mobile station, and a network part comprising a fixed infrastructure radio access network or a base station system of the radio system.

The structure of the core network 100 corresponds to the combined structure of the GSM (Global System for Mobile Communications) and GPRS systems (General Packet Radio Service). GSM network elements answer for the implementation of circuit-switched connections, and GPRS network elements for the implementation of packet-switched connections, some the network elements, however, being included in both systems.

A mobile services switching center (MSC) 102 is the center of the circuit-switched part of the core network 100. The same mobile services switching center 102 can be used to serve the connections of both the radio access network 130 and the base station system 160. The tasks of the mobile services switching center 102 include for example: connection switching, paging, user equipment location registration, handover management, collecting subscriber billing information, encryption parameter management, frequency allocation management, and echo cancellation. The number of mobile services switching centers 102 may vary; a small network operator may have only one mobile services switching center 102, but there may be several of them in large core networks 100.

Large core networks 100 may have a separate gateway mobile service switching center (GMSC) 110, which attends to the circuit-switched connections between the core network 100 and external networks 180. The gateway center 110 is located between the mobile services switching center 102 and the external networks 180. The external network 180 may be for instance a public land mobile network (PLMN) or a public switched telephone network (PSTN).

A home location register (HLR) 114 includes a permanent subscriber register, i.e. the following data: an international mobile subscriber identity IMSI, an international mobile subscriber ISDN number MSISDN, an authentication key, and, when the radio system supports GPRS, a PDP address (PDP=Packet Data Protocol).

A visitor location register (VLR) 104 includes roaming information about the user equipment 170 in the area of the mobile services switching center 102. The visitor location register 104 includes largely the same information as does the home location register 114, but the visitor location register 104 stores said information only temporarily.

An authentication center (AuC) 116 is located in the same place as the home location register 114, and it includes an individual subscriber authentication key (Ki), a ciphering key (CK) and the corresponding IMSI.

The network elements shown in FIG. 1 are functional entities whose physical implementation may vary. Usually the mobile services switching center 102 and the visitor location register 104 constitute one physical device, and the home location register 114 and the authentication center 116 a second physical device.

A serving GPRS support node (SGSN) 118 is the center of the packet-switched part of the core network 100. The main task of the serving support node 118 is to transmit and receive packets together with the subscriber equipment 170 supporting packet-switched transmission, using the radio access network 130 or the base station system 160. The serving support node 118 includes subscriber information and location information about the user equipment 170.

A gateway GPRS support node (GGSN) 120 is the counterpart of the packet-switched part to the gateway mobile service switching center 110 of the circuit-switched part, however, with the exception that the gateway support node 120 has also to be able to route traffic outgoing from the core network 100 to external networks 182, whereas the gateway mobile service switching center 110 only routes incoming traffic. In our example, the representative of the external networks 182 is the Internet.

The first radio system, i.e. the radio access network 130, is composed of radio network subsystems (RNS) 140, 150. Each radio network subsystem 140, 150 is composed of radio network controllers (RNC) 146, 156 and of nodes B 142, 144, 152, 154. Since node B is quite an abstract concept, the term base station is often used instead, which node B corresponds to.

The radio network controller 146 controls its subordinate B nodes 142, 144. In principle, the aim is to place the device implementing the radio path and the associated functions in nodes B 142, 144 and the control devices in the radio network controller 146.

The radio network controller 146 attends to for instance the following tasks: management of the radio resources of node B 142, 144, intercell handover, frequency management, i.e. allocation of frequencies to nodes B 142, 144, management of frequency hopping sequences, measurement of uplink time delays, implementation of the operation and maintenance interface, and management of power control.

Node B 142, 144 comprises at least one transceiver for implementing the WCDMA radio interface. Typically, node B serves one cell, but a solution is also feasible, wherein node B serves several sectored cells. The diameter of a cell may vary from some meters to tens of kilometers.

A second radio system, i.e. the base station system 160, is composed of a base station controller (BSC) 166 and base transceiver stations (BTS) 162, 164. The base station controller 166 controls the base transceiver station 162, 164. In principle, the aim is to place the devices implementing the radio path and the associated functions in the base station 162, 164 and the control devices in the base station controller 166. The base station controller 166 attends substantially to the same tasks as the radio network controller.

The base station 162, 164 comprises at least one transceiver, each carrier of which includes eight timeslots, i.e. the transceiver implements eight physical channels on each carrier. Typically, one base station 162, 164 serves one cell, but a solution is also feasible, wherein one base station 162, 164 serves several sectored cells. The base station 162, 164 is also considered to include a transcoder for conversion between the speech encoding format used in a radio system and the speech encoding format used in a public telephone network. However, in practice, the transcoder is usually physically located in the mobile services switching center 102. The base station 162, 164 attends to similar tasks as node B, including for instance: calculation of TA (timing advance), uplink measurements, channel encoding, encryption, decryption, frequency hopping and interference suppression.

The subscriber terminal 170 is composed of two parts: mobile equipment (ME) 172 and a UMTS subscriber identity module (USIM) 174. The USIM 174 includes user-related information and particularly information relating to information security, e.g. an encryption algorithm. The subscriber terminal 170 comprises at least one transceiver for implementing a radio link to the radio access network 130 or to the base station system 160. The subscriber terminal 170 may comprise at least two different subscriber identification units. Furthermore, the subscriber terminal 170 may comprise an antenna, a user interface and a battery. At present, there are many kinds of subscriber terminals 170, e.g. vehicle-mounted and portable. Interference suppression may also be performed in a subscriber terminal.

Figure 2:
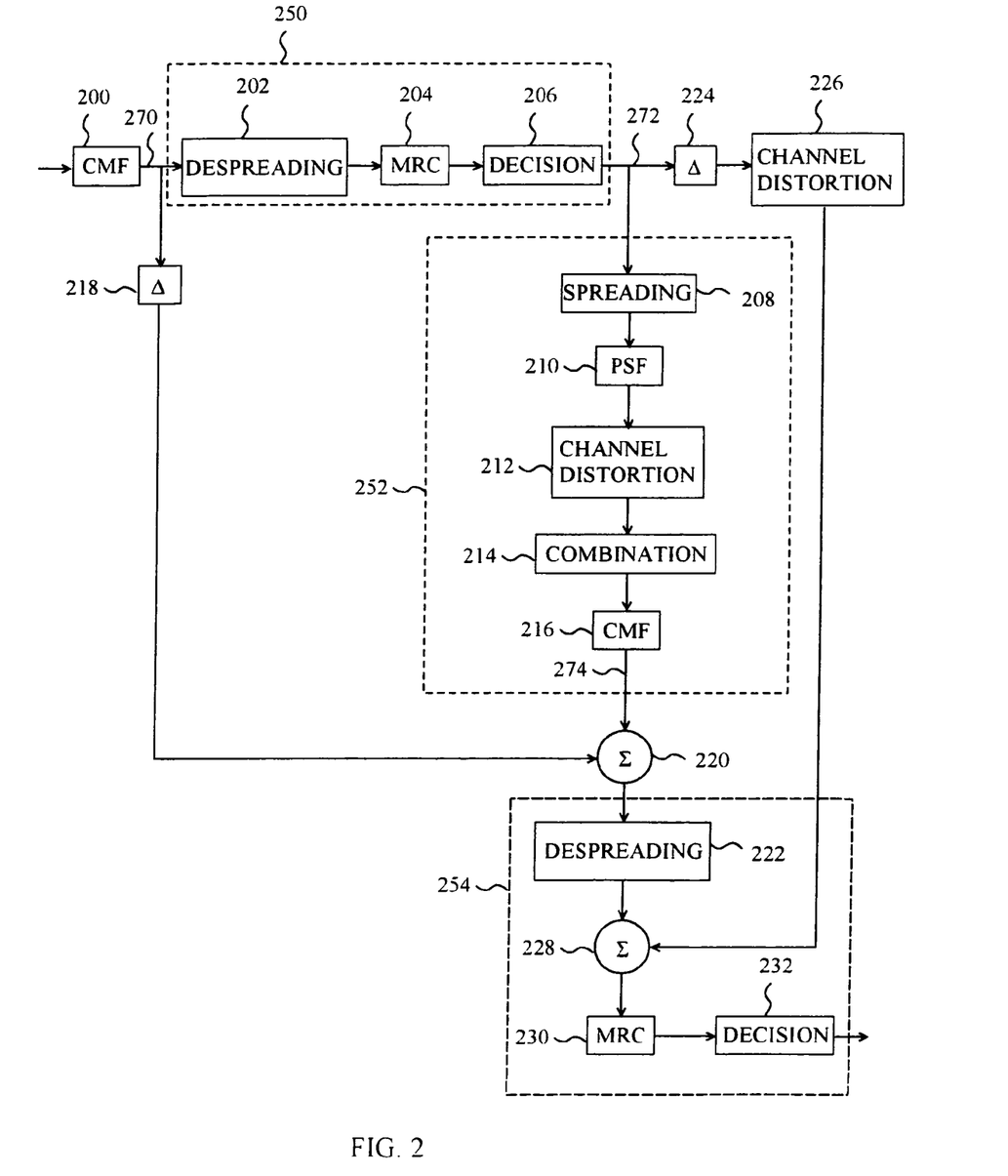
FIG. 2 shows a PIC interference suppression solution.

Let us now study a known interference suppression arrangement by means of FIG. 2. The block diagram of the example relates to PIC interference suppression. Before arriving at a filter 200, a signal is received with an antenna, the radio frequency signal is mixed into baseband and converted into digital. However, these blocks are not shown in FIG. 2. Signal processing according to the solution presented may be performed in vector form. The signal received in block 200 is subjected to reception filtering. The filter 200 integrates the received signal for generating a waveform with the desired accuracy. This is usually performed digitally by oversampling the signal and summing the samples. This filtering means for instance square root raised cosine filtering, which is also performed in the transmitter. However, it is not essential to the solution presented what kind of filtering is performed; instead, it is essential that the received signal be filtered in some manner at this stage. Spreading coding is eliminated from signal r in a despreading block 202. Despreading is performed on the signals of all users' all paths. Channel estimation is then performed, wherein a channel impulse response estimate $\hat{C}_{k,l}$ is determined, and the signal component of each user's k each path l is channel equalized in block 204 by utilizing the channel impulse response estimate $\hat{C}_{k,l}$. In addition, in block 204, the different users' signal components, propagated along different paths, are combined by using for instance maximum ratio combining. After the combination, the signal is preliminarily detected, and each user's preliminary bit decisions $\hat{b}_k$ are made in block 206. Similarly, control signals may also be detected and their bit decisions â made. The bit decisions may be hard bit decisions or soft bit decisions. If a hard bit decision associated with some user is erroneous, the interference experienced by the solution presented doubles for this user. However, bit decision b can be made for instance so that bit decision is b=tanh(Re(kappa*x)), wherein kappa is constant (depending on the signal-to-noise ratio, channel, number of users etc.) and x is a decision variable (amplitude or power). The hyperbolic tangent function limits the decision into the range [−1, 1], but the limitation may also be a narrower one within this range. Consequently, if symbol power is high, the decision is −1 or 1. If symbol power is low, the decision is close to zero. This avoids the doubling of the interference at least partly, which is of importance particularly in WCDMA receivers. Blocks 202 to 206 constitute a RAKE detector 250.

An estimate for the received signal is then generated in blocks 208 to 216, which can be called MAI estimation block 252. The signal components detected in block 208 are spreading coded user-specifically. In block 210, the spreading coded signal is filtered. Usually pulse shaping filtering is concerned, which is usually performed by using raised cosine filtering, but the kind of filtering performed is not, however, essential to the solution presented; instead, it is essential that the received signal is filtered in some manner at this point. In block 212, the signal is channel distorted, i.e. each user's signal component, propagated along each path, is multiplied by the corresponding element of the channel impulse response estimate $\hat{C}_{k,l}$. When the different users' signal components are generated, the different users' signal components are combined in block 214, the signal component delay estimates being taken into account in the combination. Finally, the estimated signal of all users is filtered in block 216 using the same reception filtering as in block 200, whereby a MAI estimate signal r̂ is generated for the received signal.

Signal r is delayed in block 218, whereby a delayed signal r is generated, from which MAI estimate signal r̂ is subtracted in a summing block 220. This leaves a residual signal r̃. The residual signal can then be decimated (not shown in FIG. 2), and the spreading coding of the residual signal is despread in block 222.

The detected signal is delayed in block 224. The delay matches the delay caused by block 252. In block 226, the delayed bit decisions are multiplied by the channel estimates $\hat{C}_{k,l}$ of each path of each user. Then, in block 228, the bits, multiplied by the channel estimate, that are to be detected in the final detection are summed to the despreading coded residual signal. The desired bits may also be omitted from the generation of the MAI estimate signal in block 252, leaving the desired bits comprised by the received signal in the residual signal when the difference is calculated in block 220, and thus the desired bits do not have to be separately added in block 228 (in this case, blocks 224, 226 and 228 are not needed). From the summing 228, the signal propagates to a channel equalizer 230, wherein the channel estimates are used to eliminate the distortion caused by the channel to the signal. The bits of the channel-corrected signal are detected in block 232. Blocks 222, 228, 230 and 232 constitute a second RAKE detector 254.

Figure 3A:
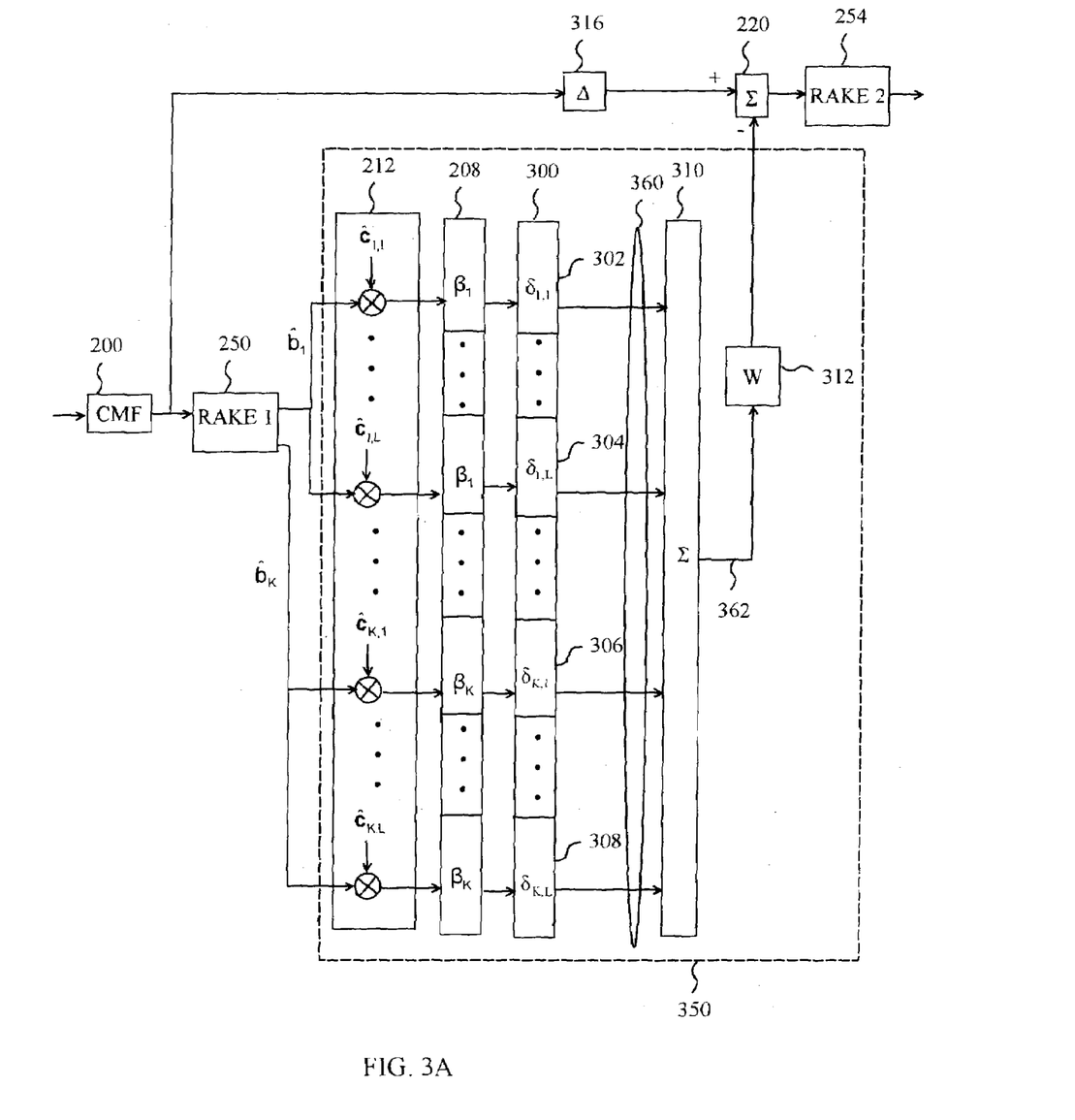
FIG. 3A shows PIC interference suppression, wherein a combination of reception filtering and pulse shaping filtering is used in the generation of an estimate signal corresponding to a received signal.

Let us study PIC interference suppression of the solution presented by means of FIG. 3A. The principle of the block diagram of FIG. 3A is similar to that in the case of FIG. 2. A signal arrives at the reception filter 200. The different users' signal components are detected from the filtered signal in the first RAKE detector 250. A signal estimate, corresponding to the received and reception filtered signal, is generated from the detected signal of at least one user in a MAI estimate block 350, wherein the distortion caused by the channel is regenerated to the detected signal by means of a channel estimate $\hat{c}_{1,1}, \ldots, \hat{c}_{1,L}, \ldots, \hat{c}_{K,1}, \ldots \hat{c}_{K,L}$ in block 212, and the signal components are spreading coded user-specifically in block 208 using a spreading code $\beta_1, \ldots, \beta_K$. The spreading coding and the distortion caused by the channel are preferably taken into account in the order shown in FIG. 3A, but the measures may also be taken in the order shown in FIG. 2. In the solution presented, the signal is then applied to a pulse generation block 300 comprising pulse generators 302 to 308 for generating pulses according to the signal component of each path of each user. In this case, each pulse $\delta_{1,1}, \ldots, \delta_{1,L}, \ldots, \delta_{K,1}, \ldots \delta_{K,L}$ occurs at a time corresponding to each delay estimate $\hat{T}_{1,1}, \ldots, \hat{T}_{1,L}, \ldots, \hat{T}_{K,1}, \ldots \hat{T}/K,L$. Pulse generators 302 to 308 are preferably impulse generators, but pulse generators 302 to 308 may also generate pulses having other shapes. The number of samples of signals leaving pulse generators 302 to 308 is $N_{spc}$ samples in one spreading code chip, which preferably corresponds to the sampling of the received signal. The pulses 360 are combined in block 310 into a pulse sequence, and the pulse sequence signal 362 is applied to a waveform filter 312, whose filtering is a combination of at least pulse shaping filtering (block 210 in FIG. 2) and reception filtering (block 216 in FIG. 2). If the pulses 360 generated by the pulse generators are other than impulses, then the filtering of the waveform filter 312 is not only pulse shaping filtering and reception filtering, but also a combination of filtering that converts the pulses generated by block 300 into impulses. The combination of pulse shaping filtering and reception filtering is preferably generated as convolution. Filtering for converting the pulses of block 300 into impulses can also be combined by convolution with the other filtering performed by the waveform filter 312. The solution presented reduces the number of filters and the number of coefficients used in the filtering, which in turn reduces multiplication operations, thus simplifying both the computing and the structure of the interference suppression implementation. For generation of a residual signal, the estimate signal generated is then subtracted from the signal that is received in sum block 220 and filtered by reception filtering and suitably delayed in block 316. In addition to the residual signal, also spreading codes, detected signal component bit decisions $\hat{b}$, detected control signal bit decisions a channel estimate matrix, and the delay estimates $\hat{T}$ of the signal components propagated along different paths, are applied to the second RAKE reception bank 254, whose structure corresponds to the structure shown in FIG. 2. The second RAKE detector 254 detects one or more users' signal bits, in which multiple access interference is cancelled.

Figure 3B:
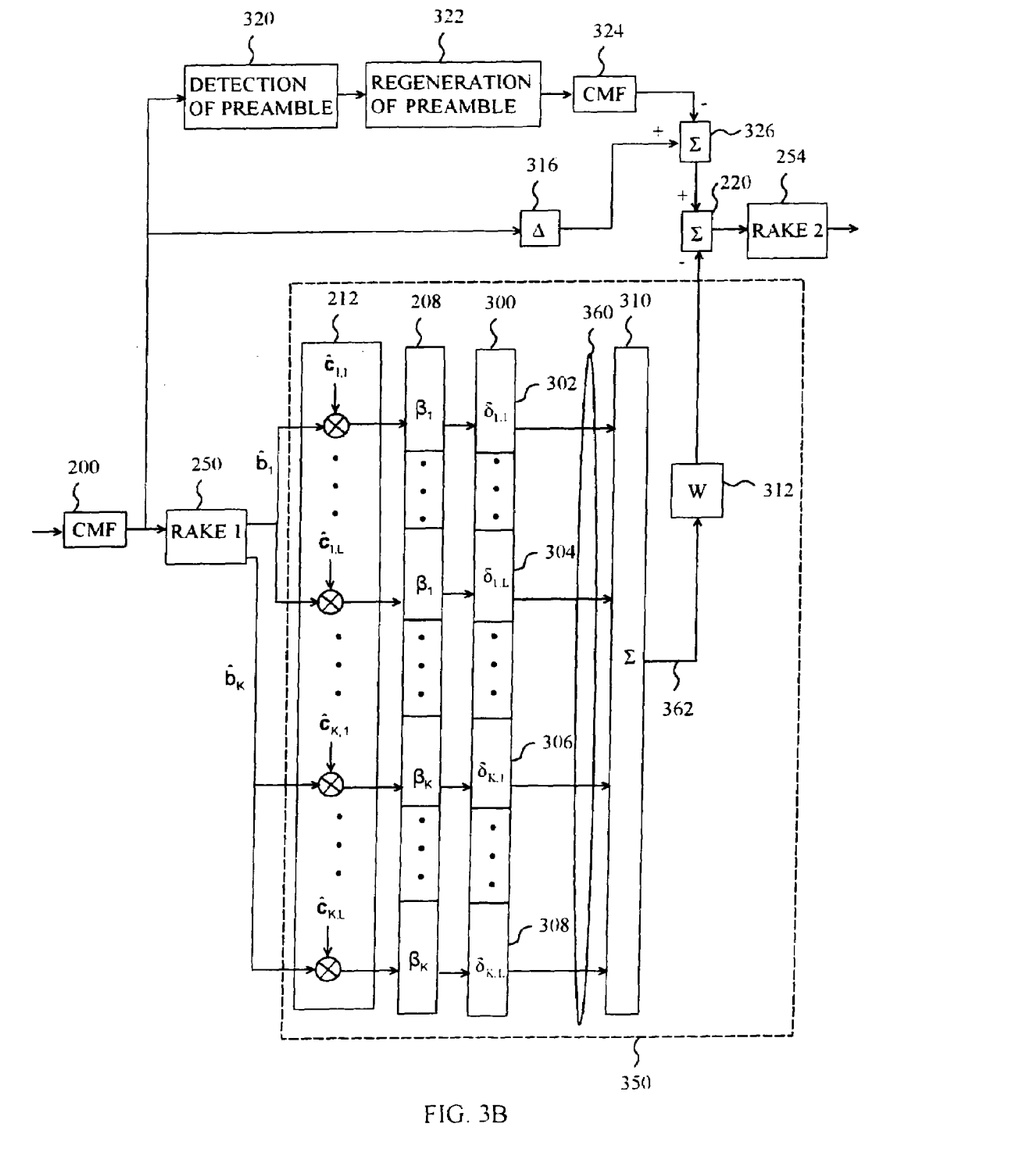
FIG. 3B shows the elimination of a preamble spreading code.

In the solution presented, a base station is also able to reduce the effect of a preamble spreading code transmitted by a terminal in the received signal, as is shown in FIG. 3B. There are a limited number (e.g. 16) of preamble spreading codes transmitted by a terminal, of which a subscriber terminal randomly selects one for transmitting a random access signal to a base station at the desired time. A receiver comprises a preamble signal detector 320, where the spreading code is identified. The preamble spreading code is regenerated in block 322 based on the identification. The preamble spreading code is filtered by reception filtering in block 324 and subtracted in summing block 326 from the received and reception filtered signal, which is suitably delayed in block 316. The MAI estimate signal is subtracted from the thus generated signal in the summer 220.

The solution presented can be described mathematically in the following manner. In the case of FIG. 2, the estimate signal $\hat{r}$ for block 252 is generated as follows:

$$\hat{r} = c^* \sum^{KL} \{[s_1(n - \tau_{k,l}) + \ldots + s_k(n - \tau_{k,L})]^* P\},$$

wherein * denotes convolution, $\tau_{k,l}$ is a delay estimate, and $s_i(n-\tau_{k,l})$ is the spreading coded signal of the ith user. In accordance with the solution presented, in the case of FIG. 3, the estimate signal $\hat{r}$ for all paths L of all users K is generated in block 350 as follows:

$$\hat{r} = W^* \delta(\tau_{k,l}),$$

wherein W is waveform filtering, wherein pulse shaping filtering p and reception filtering c are combined by convolution, and $\delta(\tau_{k,l})$ is the impulse corresponding to the signal component of each path of each user during one spreading code chip. Waveform filtering W is thus given mathematically:

$$W = p^*c.$$

In the solution presented, the length of the impulse response of waveform filtering W can be approximately taken into account shorter than is actually given by convolution between pulse shaping filtering p and reception filtering c. If pulse shaping filtering p and reception filtering c are implemented as FIR filters (Finite Impulse Response), the number of whose taps, i.e. filtering length, is n, the number of taps used in the implementation of waveform filtering W, i.e. the length of the filter, should be 2n−1. However, in the solution presented, the number of FIR taps in waveform filtering W can be significantly reduced. A sufficient number of FIR taps in waveform filtering W, i.e. filtering length, is for instance n or even a smaller number. In accordance with the solution presented, filtering according to the deviation between the pulse and the impulse can be combined by convolution into waveform filtering, which is a convolution of at least reception filtering and pulse shaping filtering, provided the pulse generated by the pulse generator block 300 is not an impulse.

Figure 4:
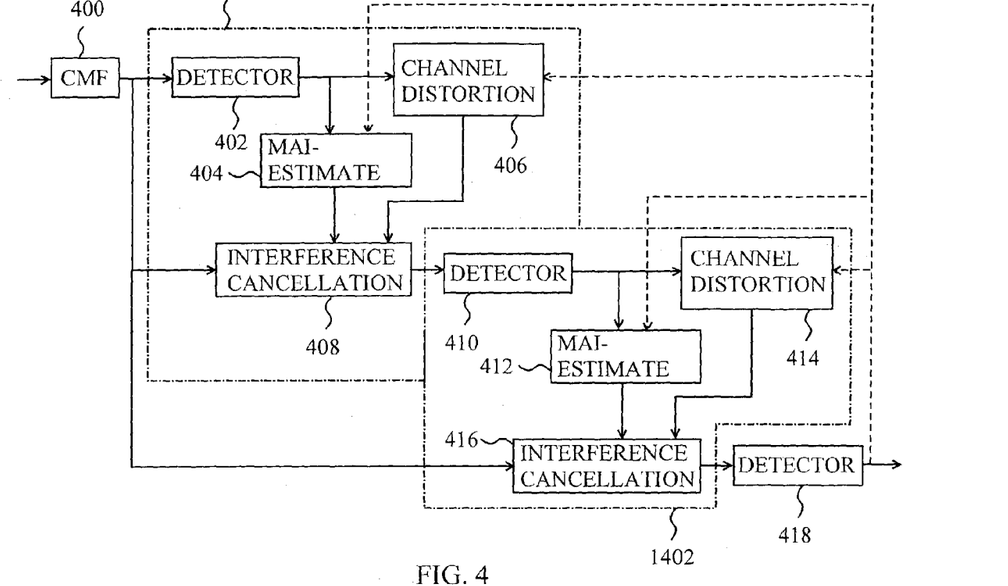
FIG. 4 shows multistage interference suppression.

The solution presented may also be implemented in multiple stages. In this case, the advantages presented are emphasized since complexity is reduced in each stage. FIG. 4 shows a two-stage PIC interference suppression structure as an example of multistage interference suppression. A received signal arrives through a reception filter 400 at a first-stage 1400 detection part 402, which corresponds to block 250 in FIGS. 2, 3A and 3B, and makes the initial bit decisions. A MAI estimate block 404, which corresponds to block 350 in FIGS. 3A and 3B, generates an estimate signal. The bit decisions made are multiplied by channel estimates in block 406. In block 408, which is part of block 254 in FIGS. 3A and 3B, the estimate signal is subtracted from the received signal, and the bit decisions, multiplied by the channel estimates, are added again to the signal to be detected, in which interference is cancelled. The signal thus generated is detected in block 410. Interference suppression is then performed again in the following stage 1402. The bits detected in block 410 are applied to a MAI estimate block 412, which also corresponds to block 350 of FIGS. 3A and 3B. The bits detected in block 410 are multiplied by the channel estimates in block 414. Interference suppression is performed in block 416, where the estimate signal generated in block 412 is subtracted from the received signal and the bits, multiplied by the channel estimates, added. The bits of the thus generated signal are detected in block 418, a block corresponding to which is part of block 254 in FIGS. 3A and 3B. As the broken lines show, the bits detected in block 418 can be also fed back to interference suppression blocks 406 and 414, and blocks 406 and 414. Since these bits, detected after interference suppression, are more reliable than the bits detected in blocks 402 and 410, the final bit decisions become more accurate. If bit decisions are applied from block 418 to blocks 408 and 410, the bit decisions of blocks 402 and 410 are not needed except for initiating interference suppression.

Figure 5:
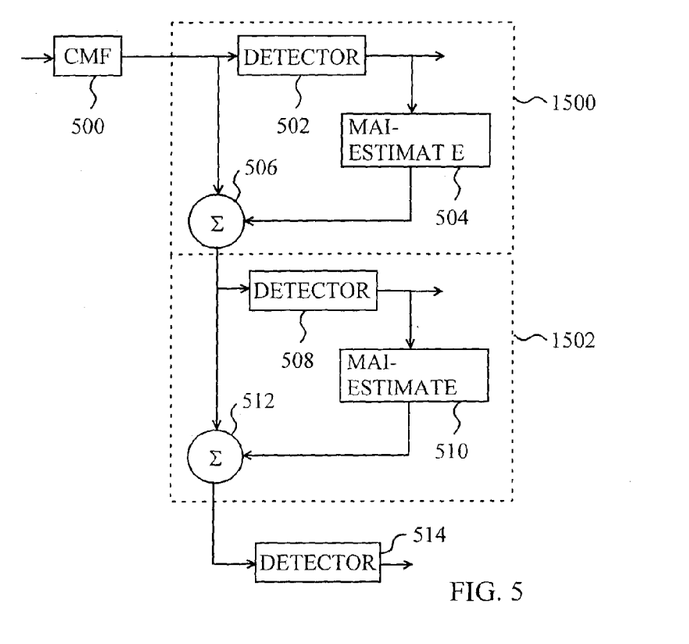
FIG. 5 shows SIC interference suppression.

The solution presented is also suitable for a SIC interference suppression structure, a GSIC interference suppression structure or any interference suppression solution, wherein a received and reception filtered signal is regenerated. FIG. 5 shows the principle of series mode interference suppression. A received signal arrives through a reception filter 500 at a first stage 1500 detection part 502, which corresponds to block 250 in FIGS. 2, 3A and 3B, and which makes the initial bit decisions. The bit decisions made are bits of one user when SIC interference suppression is concerned or bits of a user group when GSIC interference suppression is concerned. The bit decisions made are used to generate an estimate signal in a MAI estimate block 504 (corresponds to block 350 in FIGS. 3A and 3B), and the estimate signal is subtracted from the received signal in block 506. The difference signal then propagates to the next stage 1502, in whose block 508 the bits of at least one other user than the one detected in the first stage 1500 are detected. An estimate signal is generated from the detected bits in a MAI estimate block 510 (corresponds to block 350 in FIGS. 3A and 3B), and the estimate signal is subtracted from the difference signal in block 512. The bits of the thus generated, interference-cancelled signal are detected in block 514.

The solutions of the invention can be implemented, particularly when digital signal processing is concerned, for instance by programmable DSP processors (Digital Signal Processing) or possibly with ASIC or VLSI circuits (Application Specific Integrated Circuit, Very Large Scale Integration). The functions to be executed are preferably implemented as programs based on microprocessor technology.

Although the invention is described above with reference to the example according to the attached drawings, it is apparent that the invention is not limited thereto, but can be modified in a plurality of ways within the inventive idea disclosed in the appended claims.

The invention claimed is:

1. A method for multiple access interference suppression, the method comprising filtering a received signal by reception filtering, estimating the delays of at least one user's signal components, propagated along different paths, and detecting at least one user's signal preliminarily from the received signal, and, for generating an estimate signal corresponding to the received signal filtered by reception filtering,
    spreading coding and channel distorting the preliminarily detected signal;
    generating pulses, corresponding to a signal component of each path of each user, from the preliminarily detected, spreading coded and channel distorted signal;
    combining the pulses according to the delays into a pulse sequence;
    performing waveform filtering, which is a combination of at least reception filtering and pulse shaping filtering, on the pulse sequence to generate the estimate signal; and
    subtracting the estimate signal from the received signal, filtered using reception filtering, to cancel multiple access interference.

2. A method as claimed in claim 1, wherein impulse-like pulses are generated from the preliminarily detected, spreading coded and channel distorted signal.

3. A method as claimed in claim 1, wherein pulses that differ from an impulse are generated from the preliminarily detected, spreading coded and channel distorted signal, waveform filtering is not only reception filtering and pulse shaping filtering, but also a combination of filtering that converts a pulse into an impulse.

4. A method as claimed in claim 1, wherein preamble spreading coding is eliminated from the received signal.

5. A method as claimed in claim 4, wherein the preamble spreading coding is identified; the identified preamble spreading coding is regenerated; the regenerated preamble spreading coding is filtered by reception filtering and the filtered preamble spreading coding is subtracted from the received and reception filtered signal.

6. A method as claimed in claim 1, wherein at least one user's signal, detected after interference suppression, is fed back into the preliminarily detected signal.

7. A method as claimed in claim 1, wherein at least one user's signal is preliminarily detected before interference suppression.

8. A method as claimed in claim 1, wherein waveform filtering is performed as approximate filtering shorter than a filtering length determined by the combination of reception filtering and pulse shaping filtering.

9. A method as claimed in claim 1, wherein interference suppression is performed in multiple stages.

10. A method as claimed in claim 1, wherein interference suppression is performed in parallel.

11. A method as claimed in claim 1, wherein interference suppression is performed in series mode.

12. A receiver configured to suppress multiple access interference in a radio system comprising subscriber terminals and at least one base station, the terminals and at least one base station being configured to serve as the receiver; the receiver comprises a reception filter for filtering a received signal; the receiver is configured to estimate delays of at least one user's signal components propagated along different paths and to preliminarily detect at least one user's signal from the received signal, the receiver being configured to spreading code and channel distort the preliminarily detected signal; and the receiver comprising
    means for generating pulses from the preliminarily detected, spreading coded and channel distorted signal, the pulses corresponding to the signal component of each path of each user;
    means for combining the pulses according to path delays into a pulse sequence;
    means for generating an estimate signal by subjecting the pulse sequence to waveform filtering, which is a combination of at least reception filtering and pulse modifying filtering; and
    means for subtracting the estimate signal from the received signal filtered by reception filtering to cancel multiple access interference.

13. A receiver as claimed in claim 12, wherein the means for generating pulses are configured to generate impulse-like pulses from the preliminarily detected, spreading coded and channel distorted signal.

14. A receiver as claimed in claim 12, wherein the means for generating pulses are configured to generate pulses that differ from an impulse, said pulses being generated from the preliminarily detected, spreading coded and channel distorted signal, the means for performing waveform filtering are configured to act, not only as reception filtering and pulse shaping filtering, but also as a combination of filtering that converts a pulse into an impulse.

15. A receiver as claimed in claim 12, wherein the receiver further comprises means for eliminating preamble spreading coding from the received signal.

16. A receiver as claimed in claim 15, wherein the means for eliminating preamble spreading coding from the received signal comprise means for identifying the preamble spreading coding; means for regenerating the identified preamble spreading coding; means for filtering the regenerated preamble spreading coding by reception filtering and means for subtracting the filtered preamble spreading coding from the received and reception filtered signal.

17. A receiver as claimed in claim 12, wherein the receiver is configured to feed back at least one user's signal detected after interference suppression into the preliminarily detected signal.

18. A receiver as claimed in claim 12, wherein the receiver is configured to detect preliminarily at least one user's signal before interference suppression.

19. A receiver as claimed in claim 12, wherein the means for generating the estimate signal are configured to perform waveform filtering as approximate filtering shorter than a filtering length determined by the combination of reception filtering and pulse shaping filtering.

20. A receiver as claimed in claim 12, wherein the receiver is configured to perform interference suppression in multiple stages.

21. A receiver as claimed in claim 12, wherein the receiver is configured to perform interference suppression in parallel.

22. A receiver as claimed in claim 12, wherein the receiver is configured to perform interference suppression in series mode.

* * * * *